United States Patent [19]

Woo et al.

[11] 3,873,314

[45] Mar. 25, 1975

[54] RECOVERY OF CLEAN POLYESTER MATERIALS FROM PHOTOGRAPHIC FILM

[75] Inventors: James T. K. Woo, Mentor-on-the-Lake; Donald E. Glowe, Solon; J. Scott Thornton, Chagrin Falls, all of Ohio

[73] Assignee: Horizons Incorporated, a Division of Horizons Research Incorporated, Cleveland, Ohio

[22] Filed: Nov. 7, 1972

[21] Appl. No.: 304,537

[52] U.S. Cl................... 96/50 R, 96/87 R, 96/119, 75/118, 75/44 S, 134/42, 260/2.3
[51] Int. Cl......................... G03c 5/26, C08g 53/22
[58] Field of Search......... 260/2.3, 230; 134/38, 42; 75/118, 44 S; 8/80, 87; 96/48 R, 50 R, 83, 87 R, 94 R

[56] References Cited
UNITED STATES PATENTS

| | | | |
|---|---|---|---|
| 1,065,115 | 6/1913 | Danzer | 96/48 R |
| 1,637,990 | 8/1927 | Ellis et al. | 75/118 |
| 2,273,569 | 2/1942 | Goette | 75/118 |
| 2,338,672 | 1/1944 | Slack | 134/42 |
| 3,503,904 | 3/1970 | Dietz et al. | 260/2.3 |
| 3,511,657 | 5/1970 | Smith | 96/48 R |
| 3,647,422 | 3/1972 | Wainer | 75/118 |
| 3,660,079 | 5/1972 | Govani | 75/118 |
| 3,748,123 | 7/1973 | Bakker | 75/118 |

FOREIGN PATENTS OR APPLICATIONS

| | | | |
|---|---|---|---|
| 626,996 | 9/1961 | Canada | 260/2.3 |
| 40,010 | 7/1957 | Poland | 75/118 |

OTHER PUBLICATIONS
Chem. Absts., 1963, 4715, f–g–h–4716a.

*Primary Examiner*—Mary F. Kelley
*Attorney, Agent, or Firm*—Lawrence I. Field

[57] ABSTRACT

Polymers containing polyvinylidene halides are generally used as a subbing or anchoring layer between a polyester film base and a gelatin layer containing halides or other silver compounds. It has been found that the silver and silver compound containing gelatin layer can be separated cleanly from the polyester base with attendant removal of the polyvinylidene halide containing polymer from both the gelatin fractions and the polyester fraction by suitable treatment of the photographic film (whether exposed or unexposed) in polar aprotic solvents; somewhat less polar solvents comprising cyclic compounds taken from the class of aliphatic and aromatic hydrocarbons, ethers, sulfides, and ketones; and mixtures of polar aprotic solvents such as sulfoxides or amides in combination with the cyclic solvents as cosolvents. These solvents dissolve the polyvinylidene containing polymer while not affecting materially either the polyester base or the silver compound or silver metal containing gelatin layer. Of this group of solvents the polar aprotic solvents are the preferred species; mixtures of polar aprotic solvents and polar cyclic compounds being preferred next; and cyclic organic compounds which are less polar being the least preferred in view of the relatively high temperature required for suitable action. The preferred solvents are effective at room temperature, at elevated temperature below the boiling point of the solvent and in the vapor phase above the boiling point of the solvent.

8 Claims, No Drawings

RECOVERY OF CLEAN POLYESTER MATERIALS FROM PHOTOGRAPHIC FILM

BACKGROUND

Polyethyleneterephthalate (polyester) in suitably oriented form is rapidly becoming the standard film base for photographic use and particularly for that type of film which is based on silver halides dispersed in gelatin. Gelatin layers exhibit little or no bonding tendency to a clean polyester surface. As a consequence, it is necessary to lay down an intermediate layer on the polyester film base which not only sticks tightly to the polyester surface but at the same time also sticks tightly to the gelatin surface laid thereon. This layer is normally called the "subbing" layer.

Substantially all of the subbing layers now used commercially are based on the polymer, polyvinylidene chloride and congeners thereof. Originally, the homopolymeric polyvinylidene chloride itself was used but was soon discarded not only because of its limited solubility in most ordinary solvents but even when capable of being placed into solution by specialized solvents, it exhibited a tendency to crystallize and become light refracting or even opaque either on long standing or on subsequent treatment during the photographic processing. The polyvinylidene chloride was superseded very quickly after the introduction of polyester film base by copolymers containing a major proportion of polyvinylidene chloride. These copolymers are either combinations of polyvinylidene chloride and polyvinylchloride or polyvinylidene chloride and polyacrylonitrile, the latter having been found to be considerably more useful and tractable than the first copolymer indicated. However, while these two copolymers and particularly the one containing polyacrylonitrile enjoyed some measure of use, again for a brief period of time, the degree of adhesion between the gelatin layer and the polyester base was not nearly as complete as desired. In situations requiring repeated flexing of the processed film, quite often undesired separation of the gelatin layer from the polyester base was experienced.

Continued work on the subject has established that the reason for the relatively poor adhesion for the types of copolymers indicated above is due to an insufficient degree of polarity. It was found that if small amounts of polymerizable acids taken from the class of itaconic, acrylic or methacrylic acids, or the alkyl esters thereof, were polymerized along with either vinyl chloride or vinylidene chloride together with the acrylonitrile, that the desired conditions for utility under extreme service conditions could be met adequately through the use of such a copolymer (terpolymer) as the subbing layer. These subbing layers, consequently, are generally comprised of major amounts of polyvinylidene chloride, polyacrylonitrile polymerized with relatively small percentages (usually in the range of 0.5 to 3 percent) of the polymerizable acids listed previously.

While this general class of terpolymers is now customarily used as a subbing and anchoring layer for gelatin films on the polyester base, a rather broad range of varying compositions within the terpolymer are suitable for use. For example, the terpolymer may contain 30 to 98 percent by weight of polyacrylonitrile and from 0.5 to 25 percent by weight of the acids taken from the class of acrylic, methacrylic or itaconic or their comparable alkyl esters.

The subbing layers, or the layer containing the terpolymers involving polyvinylidene halides are usually extremely thin, generally less than 1 mil in thickness and sometimes more often as little as 0.1 mil or less in thickness. Consequently, the amount of material represented by this subbing layer with regard to the four component system previously described is relatively small compared to the total weight of the full system.

The usual practice employed for recovery of silver values from scrap or used photographic film is incineration which leaves the silver containing components as an ash or residue. Such a process normally not only results in loss of a portion of the silver content, entire loss of valuable gelatin components and the polyester itself, but at the same time normally produces an undesired environmental impact.

From an economic standpoint, recovery and reuse of the scrap polyester and the gelatin components has become increasingly desirable. Techniques for recovery of valuable products from the properly processed gelatin available from used or scrap photographic film have been described in U.S. Pat. No. 3,647,422, whereas techniques for utilizing the clean polyester resulting from proper manipulation of the scrap photographic film is described in U.S. Pat. No. 3,804,811 issued April 16, 1974 and entitled "Shaped Articles From Reconstituted Polyester". This latter invention describes a closed loop process which provides for utilization of polyester scrap material to derive maximum economic value from a most often useless waste with a minimum of pollution impact.

In order for the suitably prepared polyester film base to be useful for the formation of shaped articles as defined in the aforereferenced patent application, this polyester film scrap must be chemically and physically clean. In other words, it must be free from all gelatin components, and all components of the subbing layer.

Several methods for the removal of the gelatin and subbing layers from polyester film scrap have been proposed previously including those described in U.S. Pat. No. 3,047,435; Canadian Pat. No. 626,996; U.S. Pat. No. 3,503,904; U.S. Pat. No. 3,546,149; and British Pat. No. 1,134,967. These patents describe aqueous baths and alkaline organic baths for presumed simultaneous removal of the subcoats and the silver containing topcoats. These methods necessitate not only the destruction of the subcoat but also one or more layers of organic coating containing silver on the polyester base. While these processes appear to be suitable for silver recovery purposes, they are not generally effective in insuring that the polyester is recovered in chemically and physically clean form as required for the purposes of Ser. No. 243,258. More important, however, is the fact that the more rigorous methods which are most effective result in significant attack and loss of the polyester base, obviously undesirable from an economic standpoint.

For purposes of clarity, a standard silver halide film on a polyester film base may be considered to be comprised of a minimum of four valuable components. These four valuable components are respectively: (1) the clean polyester film base; (2) the subbing layer containing the polyvinylidene chloride terpolymer; (3) the gelatin layer; and, (4) the silver content of the gelatin layer. Any process which permits recovery of these four valuable components in clean and uncontaminated form suitably either for resale directly or resale after proper conversion is the most economically attractive procedure for processing such a raw material.

OBJECTS AND DESCRIPTION OF THE INVENTION

The invention described herein provides means for removal of the photosensitive emulsion and subcoat layers from new, used and outdated photographic film; provides clean separation of the emulsion and the subcoat layers from the base polyester; produces a clean polyester base suitable for reconstitution and shaping into useful articles, for example, as described in the above noted copending U.S. Pat. No. 3,804,811 the disclosure of which is intended to be incorporated herein, by this reference; provides a means for recovery of the subcoat layer in usable form if so desired; and finally, insures that each fraction and component of the entire photographic film can be recovered cleanly and substantially quantitavely in a form such that it can be suitable for reconstitution into valuble components. Further, the invention is a closed loop process which provides not only for the utilization of polyester scrap material to derive maximum economic value from a most often useless waste with a minimum of pollution impact but also at the same time provides a similar closed loop process for recovery of all the other components with a minimum pollution impact through provisions for recovery and reuse of the reagents.

It has been found that in utilization of the four component photographic system comprising a polyester film base, a subbing layer, and a gelatin layer containing silver and/or its compounds, the subcoat layer can be dissolved and separated cleanly from the other components by the use of certain solvents and mixtures of such solvents under certain conditions and in such a manner that a clean polyester fraction can be recovered, a clean silver containing gelatin fraction can also be recovered and, if desired, both the solvent used for the purpose of making the separation and the polymeric material contained in said solvent can be separately recovered. Finally, the gelatin fraction containing the silver can be treated in a number of ways either to destroy the gelatin in a non-polluting manner or to recover valuable components from the gelatin fraction while at the same time effecting the quantititive recovery of the silver in a condition such that it can be smelted readily to yield silver bullion.

The solvents which are found effective for the invention are those taken from the class of polar aprotic solvents, solvents possessing cyclic structures which include aliphatic and aromatic hydrocarbons, ethers, sulfides and ketones, some of which are polar and some of which may be considered non-polar, and finally, mixtures of specific polar aprotic solvents such as sulfoxides or amides with cyclic structure solvents of the class just described. The term "cyclic" applies not only to structures which contain benzenoid structures but also those types of cyclic structures which are non-benzenoid in character and is some cases may be considered to be quite non-polar. The cyclic compounds of a non-polar character which are capable of dissolving the subcoat without affecting either the polyester or the gelatin layer or layers on top of such subcoat are generally taken from the class of halogenated aromatic compounds such as chlorinated benzenes and naphthalenes and hydrogenated benzenoid structures such as tetrahydronaphthalene.

The most useful solvents for the purposes of the invention are the polar aprotic solvents. Almost as useful are mixtures of the polar aprotic solvents with cyclic compounds whether these cyclic compounds are highly polar or only partially polar and the least useful, though effective for our purposes are the chlorinated and/or hydrogenated benzenoid structures used at an elevated temperature.

In essence, the invention comprises certain specific steps and various modifications of such steps. The first step involves immersing the polyester scrap in one of the solvents or mixtures of solvents described above in which the weight of solvent is usually 5 to 15 times the amount of weight of the scrap.

In a first embodiment of the practice of this invention, certain specific solvents are used at room temperature. In this case, the solvent is added first to a reaction vessel fitted with a stirrer which permits vigorous stirring action. The preferred type of stirrer is a spiral screw which extends essentially from the bottom to the top of the vessel. In such room temperature operation, the scrap which has been previously chopped into a size between approximately ¼ inch in diameter and up to 1 inch in diameter is fed slowly and uniformly to the stirred solvent. The material is then allowed to digest in the solvent under slow stirring conditions for periods varying from 1 hour up to 24 hours and an average optimum time for the solvents which are most effective at room temperature for the purposes of this solution action are generally effective for dissolving the sublayer, separating the gelatin containing layer and producing the clean polyester in periods of 1 to 2 hours of digestion under the conditions indicated. After the solution of the subcoat is complete, which provides separation of the polyester base and the gelatin containing layers, the solution is then stirred violently for a period of 5 to 10 minutes with the type of spiral stirrer previously described. Under such long stirring conditions the polyester is unaffected but the gelatin layers being quite brittle breaks up into relatively fine particles much smaller than the original size of the film scrap chips. The brittleness of the gelatin layers which permits the breaking up of these layers under the violent stirring reaction is increased if the chopped composite photographic film is heated to a temperature of 80°C to 120°C for periods of 30 minutes to 1 hour to drive out the majority of the retained water in the gelatin layer.

Procedures for separating the various components of the photographic system utilizing the polyester base material will be described in later portions of this description.

In a second embodiment of this invention, the solvent is placed in the mixing tank and heated to a temperature below the boiling point and preferably not more than 10° below the boiling point. It is then stirred violently with the spiral type stirring equipment and the chopped photographic film is added slowly and in a continuous stream to the stirred hot solvent mixture. Under these conditions, the subbing coat is dissolved in a matter of a few minutes and if the temperature of treatment is of the order of 80°C or higher, dehydration of the gelatin takes place enhancing its brittleness and facilitating the breaking up of the gelatin component into fine particle sizes while still retaining the polyester portion in its original size without chemical attack and without breakup from its original size.

In a third embodiment of this invention, the subbing layer solution process is extraordinarily facilitated by subjecting the photographic composite to the vapors of a preferred solvent at temperatures at least equivalent to the boiling point of such solvent and preferably 10°C to 20°C higher. This operation requires only a few minutes and, more importantly, if the temperature of treatment is 110°C or higher, the plasticizing water contained in the gelatin layer is driven out rapidly so that no prior heat treatment is necessary, and the desired degree of gelatin embrittlement for comminution purposes through subsequent violent stirring in a chosen solvent at temperatures below 80°C is completely effective.

In a fourth embodiment of the invention, the chopped raw material containing the polyester base may be treated first in accordance with the teachings of U.S. Pat. No. 3,647,422. This permits recycling of the reagents used, recovers the silver values and makes available as a first valuable non-silver by-product the group of amino acids produced as a consequence of the alkaline hydrolysis technique utilized in the aforereferenced patent. The polyester by-product obtained as a result of this operation still contains on its surface, however, some or all of the terpolymer subbing material, since under the conditions described in U.S. Pat. No. 3,647,422, the terpolymer is only slightly affected chemically, if at all. Now, if the washed and dried polyester-subbing layer composite is treated with the solvents and solvent combinations as described above, such subbing layer is removed rapidly and efficiently leaving a chemically and physically clean polyester chip. In utilizing the preferred solvents under these conditions, the subbing layer is dissolved very rapidly in a time period which is one-half to one-quarter of the time normally required when the gelatin layer is still present on the subbing layers.

In a further embodiment of the invention, the silver-gelatin layer is removed by digestion in a water dispersion of a proteolytic enzyme under controlled conditions of time, temperature, pH and concentration. This leaves the silver fraction in a form easily recovered by filtration, the gelatin portion in digested form so that it can be discharged to the sewer without fear of pollution, and the polyester-subbing layer composite in clean but adhered form. If this fraction is treated as described above, both the polyester and the terpolymer are recovered in clean and usable form.

Whichever of the several described procedures is followed, the next stage in the process is the slurry separation of the clean polyester chips from the solution containing the relatively finely divided gelatin fraction which in turn contains silver values and the dissolved materials which have been taken out of the system by the solvent. If the gelatin containing system has been predried to a temperature in the range of 80°C to 120°C or was treated in one of the preferred polar aprotic solvents at temperatures approximately at or above the boiling point of water, a desired embrittlement of the gelatin taken place. As a consequence of such embrittlement, the violent stirring required for rapid solution breaks up these gelatin particles into sizes very much finer than the size of the original chip. Thus, the first stage in the process leading to the final product is passage of the raw hot or cold slurry through a screen whose mesh size is smaller than the largest size polyester chip and usually a size differential of at least 0.1 of an inch smaller than the smallest size polyester chip is sufficient to accomplish the desired separation. Preferably the raw hot or cold slurry is passed through a screen which appropriately is made of bronze or stainless steel. For final cleaning purposes, the polyester chips retained on this screen are washed once with the solvent used for accomplishing the initial separation of the gelatin and polyester components, the polyester chips are then removed from the screen and again slurried up in the solvent solution originally used in a concentration of 100 lbs. of polyester chips and 200 lbs. of solvent. The material is then screened and washed again as before. The washing and screening process is facilitated by using inclined ( 20° angle) electromagnetically vibrated screens. Washing for complete cleaning is accomplished on the second stage screen by a spraying-washing solution onto the screen surface from above. The polyester chips are then removed from the screen and treated in accordance with the process described in pending patent application Ser. No. 243,258. In the hot temperature vacuum processing described in said application, any remaining solvent which might interfere with the desired properties of the eventual shaped article is removed completely to leave an effectively pure polyester material. The stripping solution containing the gelatin-silver component is allowed to stand quietly without stirring for 10 minutes to 1 hour. Settling is rapid and a clean precipitate-free solution is obtained above the settled sludge. Most of this clear solution is removed by decantation and/or siphoning. The gelatin fraction is then filtered preferably on a centrifuge or a rotary vacuum filter press and the retained solvent is again collected and added to the other batches of retained solvent.

The normal photographic film involving the polyvinylidene chloride type of subbing layer will usually contain between 0.5 and 5 lbs of such subbing material per hundred lbs. of the total system. Solvent which has been utilized for stripping may be reused up to at least 20 times without further treatment without interfering with the efficiency of the process. For example, in dealing with the photographic film that contains 1 lb. of subbing material per hundred lbs. of product, 1000 lbs. of solvent is utilized in the first treatment which will yield a solution containing approximately 0.1 percent of the polyvinylidene chloride copolymer. All of the solutions to be described in the following examples have a tolerance for this copolymer up to at least 5 percent and generally up to 10 percent for the preferred solvents and through reuse of the solution on a 20 time basis the maximum concentration of the terpolymer found in the still active solution will usually not exceed 10 percent and in the majority of cases it is safe to use the solution up to a concentration of 5 percent of the polyvinylidene chloride terpolymer without harm to the process.

Either of two procedures may be followed for utilization and recovery of this solvent. The first procedure, providing the concentration of the terpolymer is in the 2 to 5 percent range, involves the direct use of the material for reuse in application as a subbing layer on fresh polyester. In this case the coating operation yields a solid film as a consequence of required heating and solvent removal at elevated temperature and the solvent may be recovered in relatively pure form with a suitable solvent recovery system as is common in the art. In a second variation, again relatively pure solvent may be recovered when the solvent containing terpolymer has reached a condition where it is no longer active for stripping purposes by vacuum distilling the solution so as to recover relatively pure solvent and leave a residue of a polyvinylidene terpolymer. This termpolymer then serves as a useful raw material for the formation of sheeting, molding products and the like.

In examining the amount of materials that are used in the photographic industry, the terpolymer will be contaminated variously with very minor quantities of surfactants, anti-static and electrically conducting materials and possibly small amounts of various polymeric materials, and possibly, though not always, water-soluble black material which is utilized for anti-halation purposes. These types of impurities do not interfere materially with the utility of the terpolymer recovered product for sheeting and/or molding purposes. However, for certain applications, particularly those requiring clarity and water whiteness, these impurities can be removed by powdering the terpolymer and digesting and washing in water, or methyl alcohol or mixtures thereof at room temperature, in which solvents the terpolymer is insoluble and all of the aforementioned minor contaminations are soluble.

There are several ways to recover the silver values from the gelatin fraction. For example, the gelatin containing silver values may simply be incinerated and the silver ash resulting then smelted suitably for the production of bullion. This is the least attractive of the various techniques for the removal of gelatin in view not only of the atmospheric pollution problem but also because of the loss of the gelatin values. In a second procedure, the gelatin-silver fraction is mixed with an equal weight of ammonium nitrate and the product is then pulverized to yield not only a fine state of subdivision but also to insure an intimate mixture of the reagents. While an equal weight of ammonium nitrate compared to the weight of gelatin is generally sufficient, amounts of ammonium nitrate up to 3 times that of the gelatin fraction may also be used. The mixture is then packed into stainless steel pans and passed through a tunnel kiln heated to a temperature in a range of 300°C to 500°C, a temperature of 400°C to 450°C being preferred. Under these conditions, flameless combustion takes place and a clean gas is produced which contains no visible smoke particles. This clean gas is comprised of a mixture of carbon dioxide, water vapor, nitrous oxide and nitric oxide. By bleeding sufficient air into the flues of the tunnel kiln, this colorless gas may be vented directly to the atmosphere at concentrations which may be considered well below significant pollution levels or the flue gas may be passed through water scrubbing towers to recover oxides of nitrogen which may be recycled for formation of fresh ammonium nitrate, if desired.

The preferred procedure for recovering the gelatin-silver fraction is to treat this fraction with sodium hydroxide in a closed loop process which provides for the substantially quantitative recover of the silver values along with the amino acids which are derived from the hydrolyzed gelatin, as described in U.S. Pat. No. 3,647,422.

In earlier portions of this description, solvents which are preferred for the purposes of the invention have been defined in general terms. As indicated, the preferred species are polar aprotic solvents and mixtures thereof which are capable of dissolving the terpolymer subbing layer at or near room temperature. These types of solvents and the mixtures thereof more specifically are listed in Table 6. Almost equally effective, again, are polar aprotic solvents, either alone or in mixture, which are capable of acting at or slightly above room temperature. These are listed in Tables 3 and 5. Polar aprotic solvents in the unmixed condition which are effective for the purposes of the invention but which require temperatures somewhat above room temperature for effective reaction are listed in Tables 1 and 2. The least effective though still suitable for the purposes of the inventions is the group of solvents listed in Table 4. Some solvents may be used for stripping purposes at room temperature, such stripping may require several hours for completion. completeion. The same solvent may be more effective at higher temperatures and these higher temperatures are listed in the table. The principal reason for the lower degree of utility of the types of solvents which are listed in Table 4, is that in spite of the fact that they are effective stripping agents at the temperatures listed in the table, the tolerance of the solvent for the terpolymer at room temperature is limited and thus the circulation, treatment, settling and solvent recovery has to be carried out while maintaining these elevated temperatuures to prevent premature precipitation or gelling of the stripped terpolymer. The majority of the other solvents maintain a high tolerance of solvency for the terpolymer even at room temperature and well within the limits defined in the previous description.

EXAMPLES

For all of the examples listed hereinafter, the photographic composite material scrap is first chopped into pieces approximately 0.25 inches or larger in diameter. The screen for separating the cleaned polyester chip from the balance of the gelatin-silver halide-terpolymer system carried as a slurry and solution in the stripping solvent may be as coarse as that equivalent to a mesh size opening of 0.15 inches and may be as low as a screen size exhibiting an opening of 0.03 inches. After chopping to the 0.25 inch average diameter, the material is heated to a temprature of 110°C for 30 minutes prior to introduction of the material into the solvent stripping mixture. This heat treatment for removal of water from the gelatin layer is always required if the temperature of the stripping mixture is less than 80°C and adds an advantage in case of breaking up of the gelatin in the violent stirring and shearing action described previously even though the temperature of the solvent treatment is above 80°C. However, if the temperature of the solvent treatment is 100° C or higher, the preheating for increasing the embrittlement and ease of breaking up of the gelatin represents a still further advantage.

For each of the examples listed in the tables, 100 lbs. of photographic film was used and treated in accordance with the conditions listed in the with 1000 lbs. of solvent. The dwell times and temperature conditions for each solvent are also listed in the tables of examples.

TABLE 1

POLAR APROTIC SOLVENTS
(Reaction Temperature 100°C or Less)

| Example Number | Solvent | Temperature °C | Time (Minutes) |
|---|---|---|---|
| 1. | Hexamethyl phosphoramide | 20 – 50 | 5 – 10 |
| 2. | Tetramethylene sulfoxide | 35 – 50 | 5 – 10 |
| 3. | N-acetyl piperidene | 35 – 60 | 5 – 10 |
| 4. | N-methyl pyrolidone | 40 – 60 | 5 – 10 |
| 5. | N-formylhexamethyleneimine | 40 – 60 | 10 – 12 |
| 6. | Trimethylene sulfide | 80 – 100 | 15 – 20 |
| 7. | Dimethyl sulfoxide | 30 – 60 | 5 – 10 |
| 8. | N-n-butyl pyrolidone | 60 – 100 | 10 – 20 |
| 9. | Isopropyl Sulfoxide | 60 – 100 | 10 – 20 |
| 10. | N-formylpiperidene | 60 – 100 | 20 – 25 |
| 11. | Cyclohexanone | 50 – 100 | 15 – 20 |
| 12. | Cyclopentanone | 50 – 100 | 15 – 20 |
| 13. | Dimethylformamide | 50 – 100 | 15 – 20 |

TABLE 2

POLAR APROTIC SOLVENTS
(Reaction Temperature Above 100°C)

| Example Number | Solvent | Temperature °C | Time (Minutes) |
|---|---|---|---|
| 14. | N-acetylpyrrolidine | 100 – 150 | 15 – 20 |
| 15. | Tetrahydrothiophene | 100 – 150 | 15 – 20 |
| 16. | N,N-dimethylacetamide | 100 – 150 | 15 – 20 |
| 17. | Cyclooctanone | 100 – 150 | 15 – 20 |
| 18. | Cycloheptanone | 100 – 150 | 15 – 20 |
| 19. | N-butyl sulfoxide | 100 – 150 | 15 – 20 |
| 20. | Isophorone | 100 – 150 | 15 – 20 |

TABLE 3

COMMON CYCLIC COMPOUNDS
(Also Polar Aprotic)

| Example Number | Solvent | Temperature °C | Time (Minutes) |
|---|---|---|---|
| 21. | Tetrahydrofuran | 25 – 60 | 10 – 20 |
| 22. | 1,4 dioxane | 25 – 60 | 10 – 20 |

TABLE 4

NON-POLAR SOLVENTS
(Cyclic)

| Example Number | Solvent | Temperature °C | Time (Minutes) |
|---|---|---|---|
| 23. | Bromobenzene | 130 – 150 | 20 – 25 |
| 24. | Chlorobenzene | 100 – 130 | 20 – 25 |
| 25. | Dichlorobenzene | 100 – 140 | 20 – 25 |
| 26. | o-Chloronaphthalene | 100 – 140 | 20 – 25 |
| 27. | 2-methylnaphthalene | 100 – 140 | 20 – 25 |
| 28. | Tetrahydronaphthalene | 100 – 140 | 20 – 25 |

TABLE 5

1:1 (By Weight) SOLVENT MIXTURES
(Polar Aprotic + Cyclic Compounds)

| Example Number | Compound A | Compound B | Temperature °C | Time (Minutes) |
|---|---|---|---|---|
| 29. | Hexamethylphosphoramide | Tetrahydrofuran | 25 – 35 | 2 – 5 |
| 30. | Hexamethylphosphoramide | Tetrahydronaphthalene | 25 – 60 | 5 – 10 |
| 31. | Hexamethylphosphoramide | Cyclohexanone | 25 – 45 | 5 – 10 |
| 32. | Hexamethylphosphoramide | Dioxane | 25 – 45 | 3 – 10 |
| 33. | Dimethylformamide | Cyclohexane | 25 – 45 | 5 – 10 |
| 34. | Tetramethylene sulfoxide | Tetrahydrofuran | 25 – 45 | 3 – 5 |
| 35. | Tetramethylene sulfoxide | Tetrahydronaphthalene | 25 – 50 | 5 – 10 |

TABLE 6

SOLVENTS SUITABLE FOR ROOM TEMPERATURE DIGESTION

| Example Number | Solvent | | Dwell Time (Hours) |
|---|---|---|---|
| 36. | Hexamethylphosphoramide | | 1 |
| 37. | Tetramethylene sulfoxide | | 1.5 |
| 38. | Dimethyl sulfoxide | | 2.0 |
| 39. | Tetrahydrofuran | | 2.0 |
| 40. | No. 36 plus 1,4 dioxane | (35:65) | 1 |
| 41. | No. 37 plus 1,4 dioxane | (40:60) | 1 |
| 42. | No. 36 plus cyclohexanone | (35:65) | 2 |
| 43. | No. 37 plus cyclohexanone | (50:50) | 2 |
| 44. | Dimethyl formamide plus tetrahydrofuran | (35:65) | 2 |
| 45. | Dimethylformamide plus cyclohexanone | (35:65) | 4 |
| 46. | 1,4 dioxane | | 4 |
| 47. | Dimethyl formamide | | 10 |

EXAMPLE 48

In a further example of the invention 100 lbs. of exposed and developed x-ray film including a 7-mil thickness of polyester sheet as the base was chopped to an average diameter of 0.25 inches. The x-ray film had approximately 1-mil of silver containing emulsion on each side of the film and thus contained two layers of subbing material. After chopping, the material was then heated to 110°C for 30 minutes and while still hot was poured slowly and with rapid stirring into 1000 lbs. of tetrahydrofuran heated initially to 50°C. The addition of the 100 lbs. of chopped film material required a time period of approximately 6 minutes and the temperature of the bath rose to about 55°C. Maintaining the temperature of the bath at 55°C, the solution was continued to be stirred for 10 minutes thereafter, and on completion of the operation it was evident that a clean separation between the gelatin layers and the polyester base had taken place and that the gelatin had been broken up into very small particles. Using a stainless steel screen which was electromagnetically vibrated, the hot stirred slurry was poured onto the screen, said screen having a mesh size opeining of 0.1 inches. The partially cleaned polyester flake was washed with 50 lbs. of cold tetrahydrofuran while the screen was vibrated. Thereafter, the washed polyester was removed from the screen and placed in a container fitted with a stirrer and containing 200 lbs. of tetrahydrofuran. The slurry was again passed over the screen and again washed on the vibrating screen with 25 lbs. of tetrahydrofuran. The washed polyester flakes containing some residual tetrahydrofuran was then subjected to a vacuum treatment at 450°F (232°C) in a manner and under the time cycles described in the copending U.S. Pat. No. 3,804,811, entitled "Shaped Articles From Reconstituted Polyester". 74 lbs. of clean polyester was recovered from this operation.

The tetrahydrofuran solution containing dissolved polyvinylidene chloride terpolymer and precipitated finely divided gelatin with contained silver compound was allowed to settle and the clear tetrahydrofuran solution was decanted into a retaining vessel. The gelatin containing sludge remaining was rendered essentially solvent-free on a centrifuge filter and the liquid extracted in the centrifuge was added to the tetrahydrofuran contained in the retaining vessel. The tetrahydrofuran solution was then evaporated to a dryness by vacuum distillation at 40°C and at 10 millimeters of pressure. This vacuum distillation was continued until no further tetrahydrofuran was removed from the reaction vessel. 4.5 lbs. of solid polymeric material was recovered from the reaction vessel and a combination of chemical and spectrophotochemical analysis indicated that it was comprised principally of the terpolymer of polyvinylidene chloride, polyacrylonitrile, and the polymerized itaconic acid. The analysis indicated that the purity of this polymer was approximately 96 percent. In the vacuum distillation, 1250 lbs. of pure tetrahydrofuran was recovered in usable form, this representing a yield of 98 percent of the original solvent used (this amount being 1275 lbs.).

The spun-dried gelatin fraction was dried for 1 hour at 65°C and found to weight approximately 21 lbs. An assay of this material established that this material contained approximately 25 troy ounces of metallic silver and the balance (both as consequence of incineration and through sodium hydroxide hydrolysis) was apparently substantially all gelatin. Unexposed x-ray film will normally contain about twice this amount of silver.

EXAMPLE 49

Photographic film normally used for aerial reconnaissance purposes was used as the basic raw material. This film differs significantly from x-ray film in that it is normally on a 5 mil polyester base and is covered on one side rather than on both sides of the base as is the usual practice in the manufacture of x-ray film.

Following the procedure of Example 48, 98 percent of the solvent used for stripping purposes was recovered as before along with approximately 88 lbs. of polyester, 10 lbs. of gelatin containing material, 0.8 lbs. of the polyvinylidene chloride terpolymer and 30 troy ounces of metallic silver equivalent (the reconnaissance film used in this case was unexposed). When exposed film is used, the amount of silver recovered will vary from 4 troy ounces up to about 20 troy ounces per 100 lbs. of film base material.

EXAMPLE 50

The same as Example 48, except that cyclohexanone was used as the solvent at 80°C. The film was chopped into 1 inch nominal diameter pieces and heat treated at 110°C for 30 minutes and then poured while still hot into the violently stirred cyclohexanone solution in which solution it was retained for 15 minutes after the addition of the chopped 1 inch photographic raw material was added to the solution. 7-mil double-sided, unexposed x-ray film was used as the basic raw material. The cyclohexanone was recovered for quantitative measuring purposes by vacuum distillation at 10 millimeters at a temperature of 60°C. The yields of solvent, terpolymer and polyester were approximately the same as previously described for the example dealing with tetrahydrofuran (No. 48), except that the silver assay of the gelatin fraction was approximately 50 troy ounces, and the weight of the gelatin fraction containing the silver was 17 lbs. The x-ray films used in Examples 48 and 50 were made by different manufacturers.

EXAMPLE 51

100 lbs. of chopped unexposed 7-mil polyester base x-ray film was treated with a hot caustic solution in accordance with the teachings of U.S. Pat. No. 3,647,422. The cleaned, washed and dried polyester containing fraction thereby produced weighed 78 lbs. The polyester fraction was digested in 200 lbs. of tetrahydrofuran with rapid stirring at 55°C for 5 minutes in accordance with the present invention. The batch was screened and washed as previously described and all the fractions collected for recovery and analysis. The recoveries were as follows: 74 lbs. of polyester, 4.0 lbs. of terpolymer containing polyvinylidene chloride, 27 lbs. of amino acids and 50 troy ounces of silver equivalent. The increase in yield beyond the 100 lbs. was due to the transformation of the gelatin components into the heavier amino acid equivalent.

EXAMPLES 52–55

100 lbs. of exposed x-ray film as defined in Example 48 were used in each case. Each 100 lbs. was disperesed in 500 lbs. of deionized water (pH 6.7) and said water had been adjusted previously to the temperature and pH indicated in the table. The digestion was carried out with stirring. The solution was screened and the precipitate collected by filtration from the solution passing through the screen and the water washed polyester flake recovered from the screen proper.

| Example Number | Enzyme | pH | Temp. | Lbs. of Enzyme per 100 lbs. of Film | Time |
| --- | --- | --- | --- | --- | --- |
| 52. | *Rhozyme P-53 | 7.0 | 50°C | 0.125 | 16 minutes |
| 53. | *Rhozyme P-53 | 8.0 | 50°C | 0.25 | 15 minutes |
| 54. | *Rhozyme P-53 | 8.5 | 50°C | 0.5 | 14 minutes |
| 55. | *Rhozyme P-53 | 9.0 | 50°C | 0.25 | 13 minutes |

*Tradename for proteolytic enzyme manufactured by Rohm & Haas, Philadelphia, Pennsylvania.

In each of Examples 52–55, the clean and dried polyester fraction weighed 79 lbs. After washing with tetrahydrofuran as defined in Example 51 and vacuum distillation recovery of the tetrahydrofuran, 74 lbs. of clean polyethyleneterephthalate were recovered and 5 lbs. of terpolymer containing polyvinylidene chloride. The silver fraction, recovered by filtration of the water enzyme digested gelatin solution assayed approximately 26 troy ounces in each case. The water-enzyme digested gelatin solution was discharged to the sewer.

We claim:

1. A process for the recovery of valuable constituents of photographic film consisting of a polyester film base coated on at least one surface with a subbing layer of vinylidene terpolymer material to which a gelatin silver halide coating has been applied as an overcoating, which process consists of:

preheating small pieces of said film to a temperature sufficient to remove water from the gelatin layer;

contacting small pieces of said previously heated film with a polar aprotic solvent for dissolving the terpolymer subbing layer;

maintaining said pieces of film in contact with said polar aprotic solvent at about room temperature until dissolution of said terpolymer subbing layer is completed and the gelatin silver halide overcoating has been detached from the film base;

thereafter stirring the resulting mixture violently to break up the detached gelatin silver halide coating; and separately recovering said (1) polyester film base, (2) detached gelatin coating and the silver therein, and (3) said terpolymer subbing material.

2. The process of claim 1 in which a mixture of polar aprotic and cyclic solvents is used.

3. The process of claim 1 in which the pieces of film are preheated to up to 120°C before being introduced into contact with the solvent.

4. The process of claim 1 in which the polyester base of the pieces of film is separated from the other materials present by screening.

5. The process of claim 1 in which the silver is recovered from the gelatin containing material which has separated and become detached from the pieces of film by effecting flameless combustion of said gelatin containing material admixed with ammonium nitrate.

6. The process of claim 1 in which the stirred mixture is maintained at a temperature between about 80° and 120°C during said stirring.

7. A process for the recovery of valuable constituents of photographic film consisting of a polyester film base coated on at least one surface with a subbing layer of terpolymer material to which a gelatin silver halide coating has been applied as an overcoating, which process consists of:

contacting small pieces of said film with a heated polar aprotic solvent for dissolving the terpolymer subbing layer;

maintaining said pieces of film in contact with said heated solvent at a temperature sufficient for a substantial evolution of water from said gelatin layer and until dissolution of the terpolymer subbing layer is completed and the gelatin silver halide overcoating has been detached from the film base; and separately recovering (1) said polyester film base, (2) said detached gelatin coating and the silver therein, and (3) said terpolymer subbing material.

8. A process for the recovery of valuable constituents of photographic film consisting of a polyester film base coated on at least one surface with a subbing layer of a vinylidene terpolymer material to which a gelatin silver halide coating has been applied as an overcoating, which process consists of:

contacting small pieces of said film with a vaporized polar aprotic solvent for dissolving the terpolymer subbing layer;

maintaining said pieces of film in contact with said vaporized solvent at a temperature above the boiling point of the solvent until dissolution of the terpolymer subbing layer is completed and substantial amounts of water have been eliminated from the gelatin and the gelatin silver halide overcoating has been detached from the film base; and separately recovering (1) said polyester film base, (2) said detached gelatin coating and the silver therein, and (3) said terpolymer subbing material.

* * * * *